April 18, 1967  G. W. CARLBERG ET AL  3,315,064
ELECTRICALLY HEATED MILK BOTTLE CHEST
Filed Sept. 22, 1965

INVENTORS
GUSTAV W. CARLBERG
RICHARD A. CARLBERG
BY
Borst & Borst
ATTORNEYS

United States Patent Office 3,315,064
Patented Apr. 18, 1967

3,315,064
ELECTRICALLY HEATED MILK BOTTLE CHEST
Gustav W. Carlberg and Richard A. Carlberg, both of 161—01 89th Ave., Jamaica, N.Y. 11432
Filed Sept. 22, 1965, Ser. No. 489,190
4 Claims. (Cl. 219—518)

This invention relates to thermal devices and in particular to containers the interior of which is heated by means of electrical elements.

One object of the invention is to provide a receptacle for housing food and potables which it is desirable to maintain at above freezing temperatures.

Another object of the invention is to provide heated food receptacles which are operative solely when the food is placed within the receptacle providing an actuator is set for that purpose.

A further object of the invention is the provision of a heated food receptacle which is thermostat controlled to operate below selected temperature levels.

In general, the food receptacle contemplated by this invention is intended to house dairy products such as milk. The receptacle is provided with a heating circuit preferably containing a make and break device which is responsive to the deposition of bottles for the milk within the receptacle. The heating circuit is controlled by an actuator which is manually set by an outer dial and is maintained in its dial selected position by the lid of the receptacle. The actuator is connected to a heating coil, and a thermostat for controlling the temperature within the receptacle. The purpose of the actuator is to assure operation of the heating circuit solely under special conditions as when filled bottles rather than empties are placed in the box, either bottle being adapted to close the make and break device. The thermostat is used to shut off the circuit at a temperature level above which food spoilage would begin to occur in the normal time that the receptacle is in use.

Other objects and advantages of the invention will be appreciated on reading the following detailed description of one embodiment thereof which is taken in conjunction with the accompanying drawings, in which.

Figure 1:
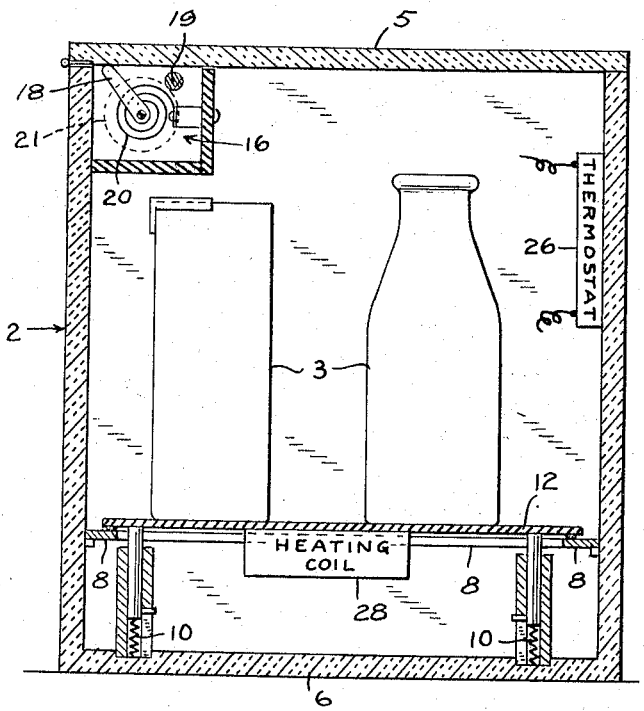
FIG. 1 is a vertical cross-section of the container embodying the invention.
Figure 2:
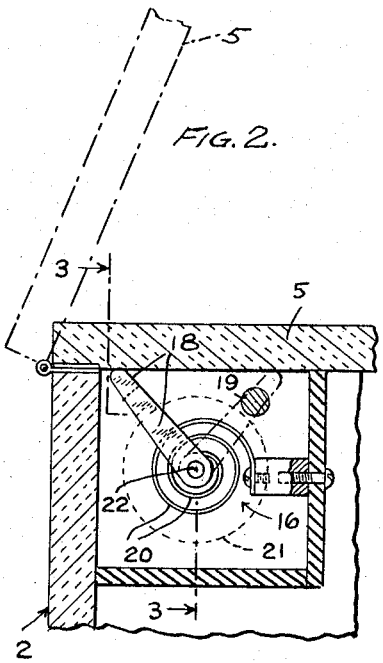
FIG. 2 is a fragmentary view on an enlarged scale showing the controlling elements of the milk chest actuator.

Referring to the drawing, milk bottle chest 2 is provided with a hinged lid 5 on top and a base 6 at the bottom thereof. Proximate the base and mounted on the inner wall of the chest and secured thereto is annular terminal 8 in the form of a frame and electrically connected by conductor 9 to an arm later to be described. Mounted within the lower part of the chest 2 by means of spring supports 10 is a platform 12 having on its bottom periphery a ring contact 14 adapted on depression of the spring supported platform 12 to make electrical contact with the terminal 8.

Figure 4:
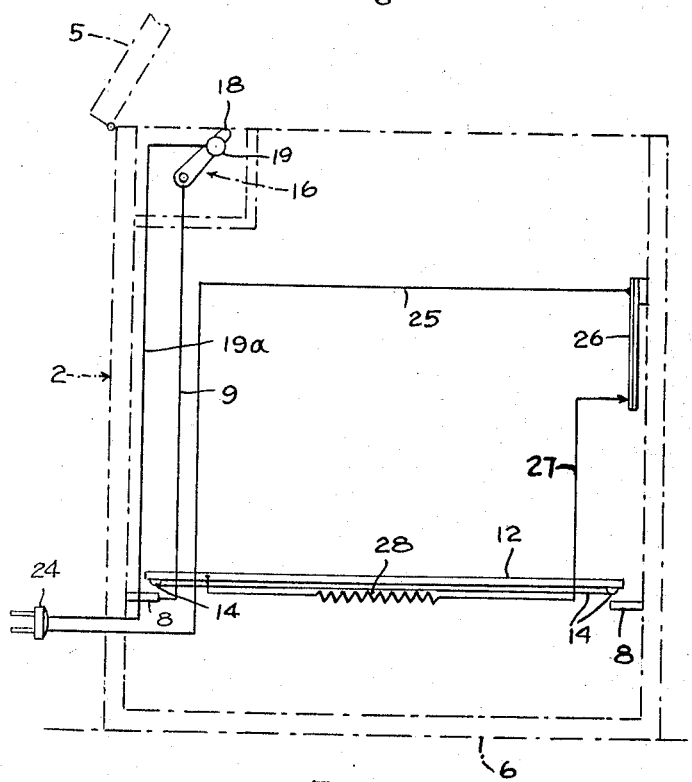
FIG. 4 is a wiring diagram of the invention with the cover open.
Figure 3:
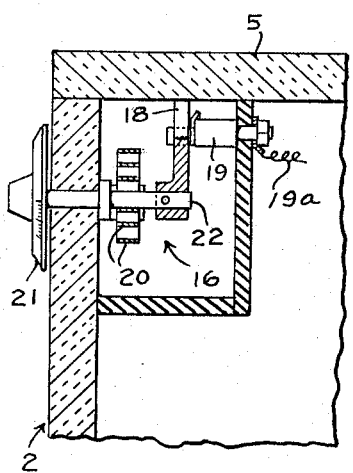
FIG. 3 is a fragmentary section taken on line 3—3 of FIG. 2 with the cover closed.

Secured to an upper wall portion of the chest 2 is switch actuator 16 comprising a switch arm 18 journalled in a wall of the chest, the switch arm 18 being biased into closed position by spiral spring 20 as shown more clearly in FIGURES 3 and 4. The switch arm 18 makes contact with a post 19 to which a conductor 19a is secured completing the circuit to plug 24. An outside dial 21 is mounted on the shaft 22 for the switch arm enabling the user to turn the arm against its spring into open position in which it is maintained by the closed lid 5.

The actuator 16 is one element of a heating circuit which is supplied house current by means of the plug 24. Another element is thermostat 26 mounted on an inner wall of the chest 2. One side of the thermostat is connected by conductor 25 to the plug the other side being connected by line 27 to a heating coil 28 disposed under the platform 8. The coil is connectable to the plug by means of platform contact 14, terminal 8 and actuator lines 9 and 19a. The thermostat is a bimetallic member which is adapted to open the heating circuit when the air temperature within the chest 2 reaches a prescribed level.

It may be seen that in operation empty bottles may be placed on the platform 12 in the chest with the actuator 16 dialed to open position and there maintained by the lid 5 of the chest. When the lid is opened to replace the empty bottles with bottles filled with milk, the actuator 16 snaps to closed position and the contact 14 engages at least one arcuate area of the terminal 8. Current is then permitted to flow through the heating coil 28 to warm the interior of the chest until it is cut off either by removing the bottles or by the thermostat 26 in the event that the preselected temperature level is reached. In this manner fresh milk is kept from freezing but yet precluded from deterioration until the user removes the milk containers 3 for house refrigerator storage.

Various other embodiments of the invention may be perceived by persons skilled in the art without departing from the scope and principle of the invention as defined in the appended claims.

We claim:

1. In a chest a casing having a top lid and a heating circuit comprising an actuator switch mounted on the casing and having a terminal post and an arm engageable with said lid, said arm being pivotally mounted and spring biased on a shaft journalled in said casing and adapted to engage the post to close said heating circuit, a dial on the shaft for selectively placing the arm in either closed or open circuit position, said lid being disposed to maintain the arm in its dial selected position, said heating circuit including a heating coil and voltage supply.

2. In a milk chest a casing having a top lid, an actuator switch mounted on the casing and having a spring pressed arm engageable with said lid, a spring supported platform disposed within the casing and supporting an electrical contact, a second contact supported by the casing and adapted to be engaged by said electrical contact, said contacts being in series connection with said actuator switch, a heating coil disposed within the casing and connected to one of said contacts and a voltage supply for said coil.

3. In a milk chest as defined in claim 2 wherein a thermostat is also connected to said supply.

4. In a milk chest as defined in claim 2 wherein said contacts are annular in form whereby the depression of any portion of the platform will cause the contacts to engage.

References Cited by the Examiner
UNITED STATES PATENTS
1,661,354  3/1928  Ayre _____ 219—481 X RICHARD M. WOOD, *Primary Examiner*
R. F. STAUBLY, *Assistant Examiner.*